United States Patent
Li

(10) Patent No.: US 9,490,921 B2
(45) Date of Patent: Nov. 8, 2016

(54) METHOD AND TEST STATION FOR RADIO PRODUCTION TEST

(71) Applicant: Telefonaktiebolaget L M Ericsson (publ), Stockholm (SE)

(72) Inventor: Ming Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/432,903

(22) PCT Filed: Oct. 9, 2012

(86) PCT No.: PCT/CN2012/001362
§ 371 (c)(1),
(2) Date: Apr. 1, 2015

(87) PCT Pub. No.: WO2014/056123
PCT Pub. Date: Apr. 17, 2014

(65) Prior Publication Data
US 2015/0280840 A1    Oct. 1, 2015

(51) Int. Cl.
*H04B 17/00*    (2015.01)
*H04L 5/14*    (2006.01)
*H04B 17/345*    (2015.01)

(52) U.S. Cl.
CPC .......... *H04B 17/00* (2013.01); *H04B 17/345* (2015.01); *H04L 5/14* (2013.01)

(58) Field of Classification Search
None
See application file for complete search history.

(56) References Cited

U.S. PATENT DOCUMENTS

| 5,910,977 | A  | 6/1999 | Torregrossa |
| 6,853,932 | B1 | 2/2005 | Wichelman et al. |
| 2003/0158613 | A1 | 8/2003 | Chen |
| 2010/0240317 | A1 | 9/2010 | Giles et al. |
| 2012/0083219 | A1 | 4/2012 | Zhu et al. |

FOREIGN PATENT DOCUMENTS

| CN | 102438259 A | 5/2012 |
| WO | WO 2010/033984 | 3/2010 |

OTHER PUBLICATIONS

PCT International Search Report and PCT Written Opinion of the International Searching Authority for International application No. PCT/CN2012/001362, Jul. 11, 2013.
European Patent Office, Application No. 12886298.4-1855, Ref. E124010035CB, Communication, Supplementary European Search Report, 8 pages, May 18, 2016.

*Primary Examiner* — Diane Lo
(74) *Attorney, Agent, or Firm* — Baker Botts, LLP

(57) ABSTRACT

The embodiments disclose a method and test station for radio production test with respect to one and more TDD radio units, which are tested by the respective test stations simultaneously. The method comprises assigning a test case in a test suite with a time fragment which is used to executed the test case by a test station, the execution of the test case will not be interrupted within the time fragment; obtaining the execution information of the test cases being executed by other test stations; determining whether there is an interference between the execution of the test case and the execution of the test cases being executed by the other test stations based on the executed information; and executing the test case when determining that the interference will not present.

17 Claims, 4 Drawing Sheets

METHOD AND TEST STATION FOR RADIO PRODUCTION TEST

PRIORITY

This nonprovisional application is a U.S. National Stage Filing under 35 U.S.C. §371 of International Patent Application Serial No. PCT/CN2012/001362, filed Oct. 9, 2012 and entitled "METHOD AND TEST STATION FOR RADIO PRODUCTION TEST."

TECHNICAL FIELD

The present technology generally relates to radio communication, particularly to a method and test station for performing radio production test for time division duplex, TDD, radio units.

BACKGROUND

Time division duplex (TDD) wireless communication system realizes bi-directional communication with time-dividing same frequency and splitting one time frame into transmission (TX) and reception (RX) parts through certain timing sequence. The radio production test for the TDD radio units involves calibrating the characteristic and verifying the performance of the radio unit before leaving factory, including adjusting the transmitter/receiver chain gain in the radio unit when transmitting and receiving, and the like. A typical such radio production test system is depicted in FIG. 1. As illustrated, multiple TDD radio units (e.g. TDD radio units 1-3) are tested by the respective test stations (e.g. Test station 1-3) simultaneously in an independent manner. Usually, the physical locations of TDD radio units are close to each other. Hence, due to the use of the same TX/RX frequency, the electromagnetic wave interference among the radio units with the execution of the test cases by the different test stations is so evident that it deteriorates the accuracy of the production test. For example, when one TDD radio unit is running a TX test case, i.e. the TDD radio unit transmits specific signal to its corresponding test station (e.g. from TDD radio unit 1 to Test station 1), its radiated high power level electromagnetic wave can impact or block the normal same frequency RX test case running on another TDD radio unit, i.e. the another TDD radio unit receives a specific signal from its corresponding test station (e.g. from Test station 2 to TDD radio unit 2). In this case, radio unit 2 may receive the signal transmitted from the radio unit 1 except for the test station 2 unexpectedly, which may cause the RX test case for radio unit 2 to be distorted or blocked. In particular, it can cause false yield loss reported by the test station 2 or wrong RX calibrated data stored in the TDD radio unit 2, which could impact RX performance of radio unit 2 potentially after on-site.

The known solutions to the issue include: i) adding additional electromagnetic shielding boxes on each TDD radio unit to decrease radiated electromagnetic wave; ii) keeping long physical space among the TDD radio units. However their respective disadvantages are also obvious. For solution i), the additional hardware resources are needed in order to build shielding box, and the shielding quality of shielding box is difficult to be evaluated and guaranteed by supplier, thus the interference can not avoided thoroughly. For solution ii), the improvement is restricted by the space occupied by production line. Normally, the larger space may cause the waste of production resource.

SUMMARY

Therefore, it is an object to solve at least one of the above-mentioned problems.

According to an aspect of the embodiments, there is provided a method of radio production test for one and more TDD radio units. The one and more TDD radio units are tested by the respective test stations simultaneously in a coordinated manner. The method comprises assigning a test case in a test suite with a time fragment which is used to executed the test case by a test station, the execution of the test case will not be interrupted within the time fragment; obtaining the execution information of the test cases being executed by other test stations; determining whether there is an interference between the execution of the test case and the execution of the test cases being executed by the other test stations based on the execution information; and executing the test case when determining that the interference will not present.

According to another aspect of the embodiments, there is provided a test station for testing a TDD radio unit. The test station comprises an assigning unit, an obtaining unit, a determining unit and an executing unit. The assigning unit is adapted to assign a test case in a test suite with a time fragment which is used for executing the test case by a test station, the execution of the test case will not be interrupted within the time fragment; the obtaining unit is adapted to obtain execution information of the test cases being executed by other test stations; the determining unit is adapted to determine whether there is an interference between the execution of the test case and that of the test cases being executed by the other test stations based on the execution information; and the executing unit is adapted to execute the test case when determining that the interference will not present.

According to another aspect of the embodiments, there is provided a production test system for testing one and more TDD radio units simultaneously, comprising one and more test stations as described above.

It is advantageous to assign time fragment for each test case to ensure that the execution of the test case won't be interrupted within the time fragment and coordinate among the test stations to avoid simultaneously executing the test cases potentially incurring the mutual interference. In this way, the interference among the TDD radio units can be eliminated thoroughly.

BRIEF DESCRIPTION OF THE DRAWINGS

The technology will now be described, by way of example, based on embodiments with reference to the accompanying drawings, wherein.

DETAILED DESCRIPTION

Figure 1:
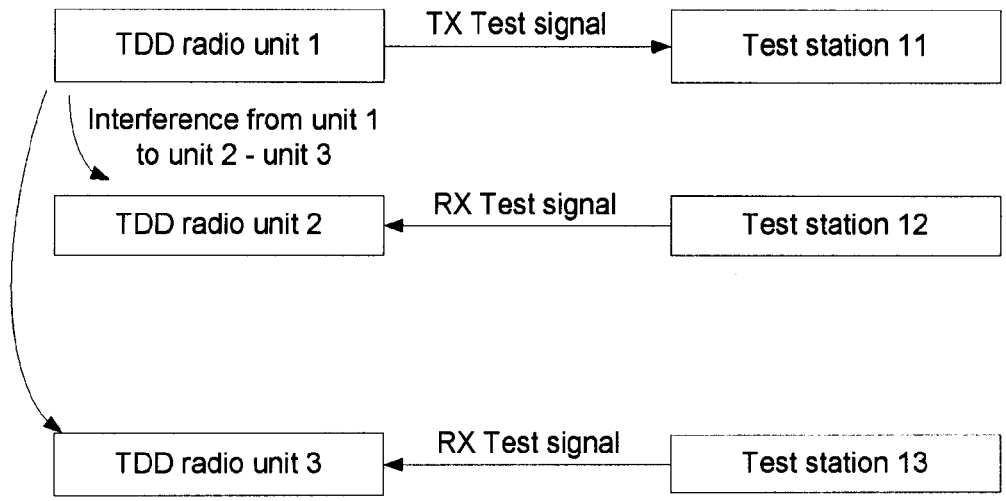
FIG. 1 illustrates a schematic view of a radio production test environment.

Embodiments herein will be described more fully hereinafter with reference to the accompanying drawings, in which embodiments are shown. This embodiments herein may, however, be embodied in many different forms and should not be construed as limited to the embodiments set forth herein. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program products according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that may contain, store, communicate, propagate, or transport the program for use by or in connection with the instruction execution system, apparatus, or device.

Although specific terms in some specifications are used here, such as radio unit, it should be understand that the embodiments are not limited to those specific terms but may be applied to all similar entities, such as base station, macro base station, femto base stations, Core Network (CN), NodeB, eNodeB etc. The radio units herein can be applicable to the Time Division Duplex Long Term Evolution (TDD-LTE) system, however, it should be understood that the radio unit may also apply to other existing communication protocols/standards, such as Global System for Mobile Communication (GSM), General Packet Radio Service (GPRS), Time Division Synchronous Code Division Multiple Access (TD-SCDMA), Wireless Fidelity (WiFi), Bluetooth, Universal Mobile Telecommunications System (UMTS), Worldwide Interoperability for Microwave Access (WiMAX), etc, and communication protocols/standards developed in the future.

Embodiments herein will be described below with reference to the drawings.

The embodiments can be implemented in the similar radio production test environment as shown in FIG. 1, which comprises the TDD radio units 1-3 and test stations 11-13. In operation, the test stations 11-13 execute the test cases for the TDD radio units 1-3 respectively. Here, the test station can be any apparatus capable of wirelessly communicating with TDD radio unit to perform production test on the TDD radio unit. The test station can be either portable or fixed. The radio unit refers to the wireless node with transmitting, receiving or transceiving function, such as base station, NodeB, eNodeB, and the like.

For simplicity and clarity, only three radio units and three test stations are shown in the radio production test environment, it will be appreciated that one or more test stations may exist in radio production test environment to perform the radio production test for the corresponding radio units.

Figure 2:
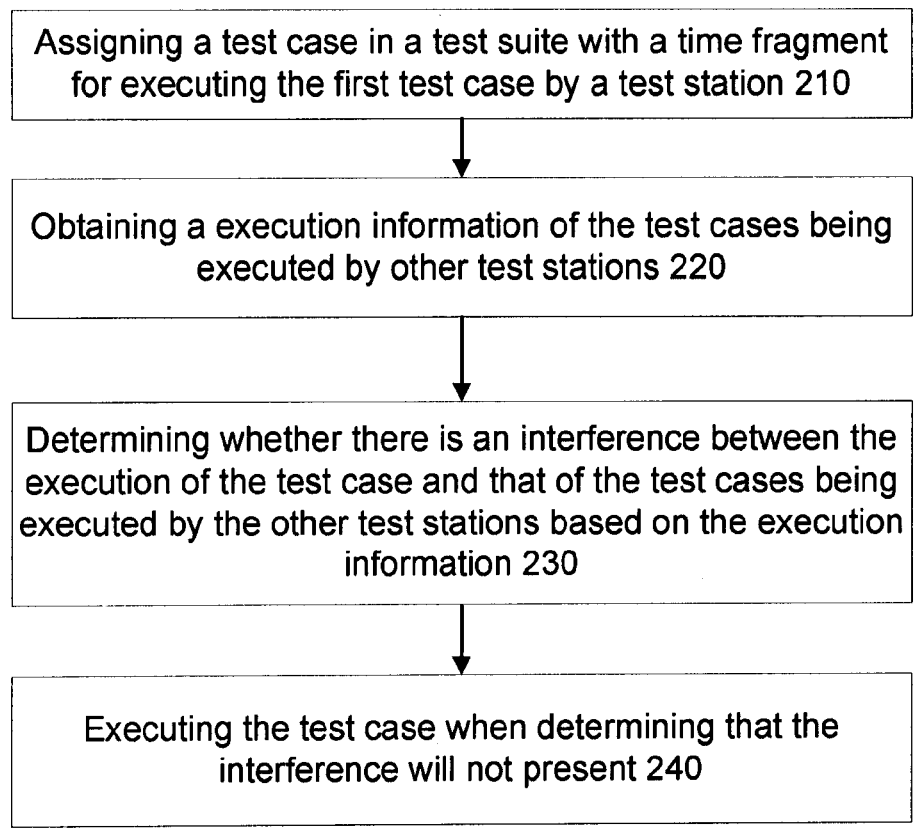
FIG. 2 illustrates a flowchart of a method for performing radio production test for the TDD radio units in accordance with an embodiment.

FIG. 2 illustrates a flowchart of a method for performing radio production test for the TDD radio units in accordance with an embodiment.

In step 210, the test station, for example test station 11, may assign a test case in a test suite with a time fragment, which is used for executing the test case for the radio unit 1 by the test station. The execution of the test case will not be interrupted within the time fragment. In this way, the test case can be executed continuously without suspension during the time fragment period until the execution is completed or the time fragment expires.

Usually the test station will execute a series of test cases on the radio unit during a production test. The test suite refers to a collection of such test cases to be executed by the test station.

There are the following types of test cases, including radio transmission test case, radio reception test case and non-radio test case, such as voltage/current test case, digital signal test case. The radio transmission test case refers to the test case requiring the radio unit transmit test signal at the operation frequency to the test station. The radio reception test case refers to the test case requiring the radio unit receive the test signal at the operation frequency from the test station. In the non-radio test case, the test signal will be communicated with other frequency different than the operation frequency or without radio transmission and reception, for example, through the wired connection.

Generally, the time fragment assigned to each test case may have the same time length, which can be a predetermined value. Alternatively, the time length of the time fragment can be dynamically determined as appropriate. For example, the time fragment can be set to be equal long to the estimated execution time of the test case. Alternatively, if the estimated execution time of the test is shorter than a lower limit, this test case can be assigned a time fragment being shared with another suitable test case.

It should be appreciated that the above time fragment assignment is described by way of example, and any suitable time fragment assignment forms can be used in this embodiment.

In step 220, the test station, for example test station 11, may obtain execution information of the test cases being executed by other test stations, such as the test station 12 and test station 13. Here, the execution information may include, but not limited to, the type of the test cases being executed by the test stations, such as radio TX test case or radio RX test case, and the information on whether the test station has started or finished executing its current test case.

Figure 5:
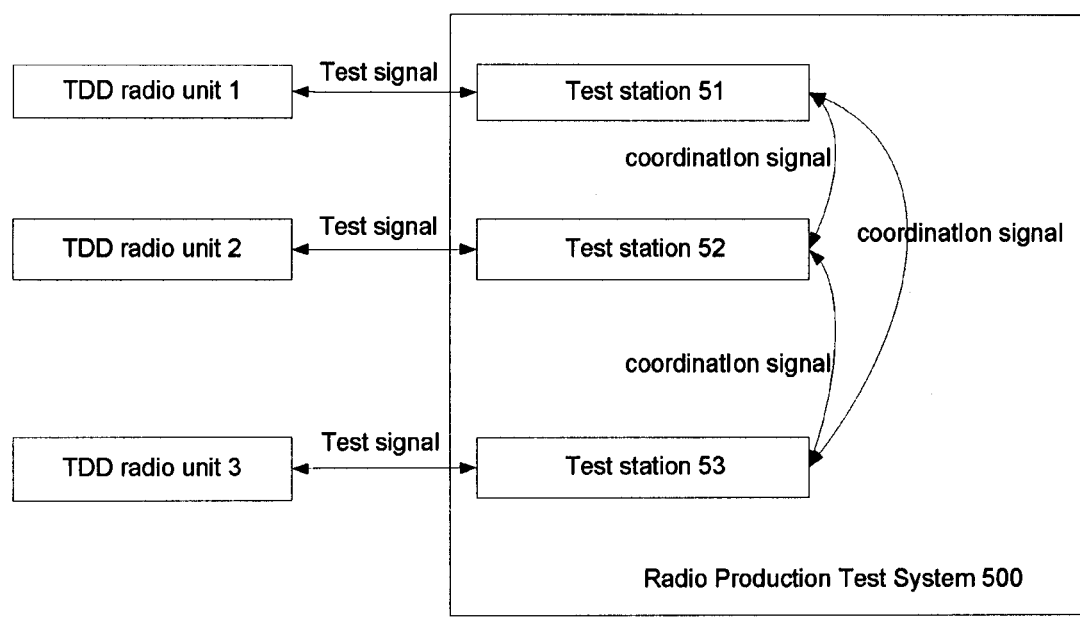
FIG. 5 illustrates another schematic view of an exemplary radio production test system according to an embodiment.

Specifically, the test station may directly communicate with other test stations to obtain the execution information. For example, as shown in FIG. 5, the test station 51 sends a request to the test station 52 and test station 53 for the execution information respectively, in response, the test station 52 and the test station 53 feedback their current execution information to the test station 51, so do the test station 52 and test station 53. Such communication link among the test stations can be setup in any suitable manner, such as in wired or wireless manner.

Alternatively, the test station, for example test station 11, may communicate with a central controller instead of the other test stations to obtain the execution information. The central controller maintains the up-to-date test case execution information of all the running test stations. The central controller can be a separate apparatus, or as a part of one of the test stations in the radio production test environment like the master coordinated control 411 illustrated in FIG. 4.

It should be appreciated that the above execution information obtaining is described by way of example, and any suitable execution information obtaining manner can be used in this embodiment.

In step 230, the test station, for example test station 11, may determine whether there is a potential interference between the execution of the test case to be executed by the test station 11 and the execution of the test cases being executed by the other test stations based on the execution information obtained in step 220. Specifically, for example, before executing the test case, the test station 11 needs to determine whether the execution of the test case will interfere or be interfered with the execution of the test cases executed by other test station or not.

For example, the test station 11 is preparing to execute a radio TX test case, and the execution information obtained by the test station 11 shows that the test station 12 is executing a radio RX test case, while the test station 13 has finished it current test case, i.e. in idle state. In accordance with the execution information, the test station 11 determines the execution of the radio TX test case to be executed by the test station 11 will interfere with the execution of the RX test case being executed by the test station 12, and the execution of the radio TX test case to be executed by the test station 11 will not interfere or be interfered with the test station 13.

In step 240, if the test station, for example test station 11, determines that the potential interference between the execution of the test case to be executed by the test station 11 and the execution of the test cases being executed by the other test stations will not present, then the test station may execute this test case. Otherwise, the test station 11 may repeat the above steps until determining that the potential interference will not occur.

Additionally or alternatively, if there is the potential interference between the execution of the test case to be executed by test station 11 and the execution of the test cases being executed by the other test stations, the test station 11 may search another test case in the test suite whose execution will not cause the interference, and execute said another test case if found. For example, the test station 11 determine that the radio TX test case to be executed by it will interfere with the execution of the test cases being executed by the test station 12 and test station 13, where both the test station 12 and the test station 13 are executing radios RX test cases. In this case, the test station 11 may search for another test case that will not cause the interference, such as the radio RX test case, voltage/current test case, etc, in the test suite. If the another test case, for example a radio RX test case, is found, the test station 11 may instead execute such radio RX test case firstly. In this way, the parallel execution of the radio production test is maximized among the test stations.

Furthermore, if multiple test cases have been found to meet the requirement, i.e. will not incur the potential interference, the test station 11 may execute the test case with the highest execution priority among them.

As a whole, by means of coordinating among the test stations to avoid simultaneously executing the test cases potentially incurring the mutual interference, the interference among the TDD radio units can be eliminated thoroughly. Meanwhile, by means of assigning time fragment for each test case, the continuous execution of the test case can be guaranteed.

In one embodiment, the test station, for example test station 11, may traverse a flag pool to retrieve a test case execution flag for each of the other test stations. The test case execution flag may indicate the execution information of the test case being executed by the other test stations. For example, the test case execution flag can be set with numeric value, for example, 0 means no test case is being executed, 1 means the test station is executing a radio TX test case, 2 means the test station is executing a radio RX test case, and the like. The flag fool is utilized to store the test case execution flags associated with the respective test stations. The flag pool can be implemented by hardware, such as the registers, and software, such as the file, database etc. It should be understood that the flag pool can be either positioned in a separate apparatus or in one of the test stations.

As such, the test station 11 may determine whether there is the interference between the execution of the test case to be executed by it and the execution of the test cases being executed by the other test stations by comparing the test case execution flag.

Preferably, the test station, for example test station 11, may updating the test case execution flag associated with this test station in the flag pool when beginning and finishing the execution of a test case. For example, when the test station 11 begins to execute a radio TX test case, it set the corresponding test case execution flag to 1 in the flag pool. And when the test station 11 completes the execution of this radio TX test case, the corresponding test case execution flag will be set to 0 in the flag pool.

In another embodiment, if the proportion of the remaining radio TX test cases and the remaining radio RX test cases to be executed exceeds a predetermined threshold, the dominant type of test cases will be prioritized to be executed. Specifically, in the case that a plurality of radio TX test cases and radio RX test cases present in the test suites executed by the test stations respectively, the process as described above may cause all the test stations always execute the same type of test cases, for example the radio TX test cases. As a result, most of the radio RX test cases will be left unexecuted. Therefore, in order to avoid such problem, when the proportion of the unexecuted radio TX test cases and the unexecuted radio RX test cases in the test suite exceeds a predetermined threshold, the test station may be forced to instead execute the dominant type of test cases remained, i.e. the radio RX test cases for this example.

Figure 3:
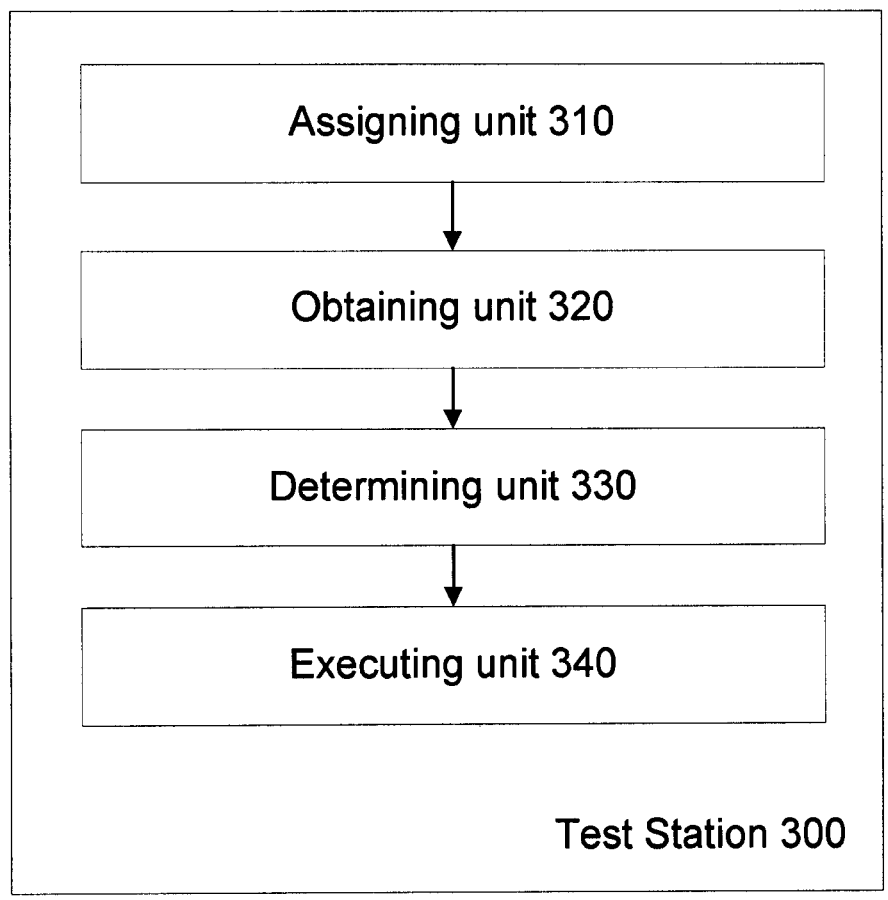
FIG. 3 illustrates a block diagram of the test station used to perform radio production test for the TDD radio unit according to an embodiment.

FIG. 3 illustrates a block diagram of the test station used to perform radio production test for the TDD radio unit according to an embodiment.

As illustrated in the FIG. 3, the test station 300 may comprise the assigning unit 310, obtaining unit 320, determining unit 330 and executing unit 340. It should be appreciated that the test station is not limited to the shown elements, and can comprise other conventional elements and the additional elements implemented for other purposes. The test station 300 may work in the similar radio production test environment as described in FIG. 1. Now the functionality of the test station 300 will now be described with reference to the FIG. 3.

In the test station 300, the assigning unit 310 may assign a test case in a test suite with a time fragment, which is used for executing the test case for a radio unit by the test station. The execution of the test case will not be interrupted within the time fragment. In this way, the test case can be executed continuously without suspension during the time fragment period until the execution is completed or the time fragment expires.

Usually the test station will execute a series of test cases on the radio unit during a production test. The test suite refers to the collection of such test cases to be executed by the test station.

There are the following types of test cases, including radio transmission test case, radio reception test case and non-radio test case, such as voltage/current test case, digital signal test case. The radio transmission test case refers to the test case requiring the radio unit transmit test signal at the operation frequency to the test station. The radio reception test case refers to the test case requiring the radio unit receive the test signal at the operation frequency from the test station. In the non-radio test case, the test signal will be communicated using other frequency different than the operation frequency.

Generally, the time fragment assigned to each test case may have the same time length, which can be a predetermined value. Alternatively, the time length of the time fragment can be dynamically determined as appropriate. For example, the time fragment can be set to be equal long to the estimated execution time of the test case. Alternatively, if the estimated execution time of the test is shorter than a lower limit, this test case can be assigned a time fragment being shared with another suitable test case.

It should be appreciated that the above time fragment assignment is described by way of example, and any suitable time fragment assignment forms can be used in this embodiment.

In the test station 300, the obtaining unit 320 may obtain execution information of the test cases being executed by other test stations in the radio production test environment. Here, the execution information may include, but not limited to, the type of the test cases being executed by the test stations, such as radio TX test case or radio RX test case, and the information on whether the test station has finished executing its current test case.

Specifically, the obtaining unit 320 may directly communicate with other test stations to obtain the execution information. For example, the obtaining unit 320 sends a request to other test stations for the execution information respectively, in response, the other test stations feedback their current execution information to the test station 300. Such communication link among the test stations can be setup in any suitable manner, such as in wired or wireless manner.

Alternatively, the obtaining unit 320 may communicate with a central controller instead of the other test stations to obtain the execution information. The central controller maintains the up-to-date test case execution information of all the running test stations. The central controller can be a separate apparatus or as a part of one of the test stations in the radio production test environment.

It should be appreciated that the above execution information obtaining is described by way of example, and any suitable execution information obtaining manner can be used in this embodiment.

In the test station 300, the determining unit 330 may determine whether there is a potential interference between the execution of the test case to be executed by the test station 300 and the execution of the test cases being executed by the other test stations based on the execution information obtained by the obtaining unit 320. Specifically, for example, before executing the test case, the determining unit 330 needs to determine whether the execution of the test case will interfere or be interfered with the execution of the test cases executed by other test station or not.

For example, the test station 300 is preparing to execute a radio TX test case, and the execution information obtained by obtaining unit 320 shows that the test station A (not shown) is executing a radio RX test case, while the test station B (not shown) has finished it current test case, i.e. in idle state. In accordance with the execution information, the determining unit 330 determines the execution of the radio TX test case to be executed by the test station 300 will interfere with the execution of the RX test case being executed by the test station A, and the execution of the radio TX test case to be executed by the test station 300 will not interfere or be interfered with the test station B.

In the test station 300, the executing unit 340 determines that the potential interference between the execution of the test case to be executed by the test station 300 and the execution of the test cases being executed by the other test stations will not present, then the test station may execute this test case. Otherwise, the test station 300 may wait until determining that the potential interference will not occur.

Additionally or alternatively, if there is the potential interference between the execution of the test case to be executed by test station 300 and the execution of the test cases being executed by the other test stations, the executing unit 340 may search another test case in the test suite whose execution will not cause the interference, and execute said another test case if found. For example, the determining unit 330 determines that the radio TX test case to be executed by the test station 300 will interfere with the execution of the test cases being executed by the test station A which is executing radio RX test case. In this case, the executing unit 340 may search for another test case that will not cause the interference, such as the radio RX test case, voltage/current test case, etc, in the test suite. If the another test case, for example a radio RX test case, is found, the executing unit 340 may instead execute such radio RX test case firstly. In this way, the parallel execution of the radio production test is maximized among the test stations.

Furthermore, if multiple test cases have been found to meet the requirement, i.e. will not incur the potential interference, the executing unit 340 may execute the test case with the highest execution priority among them.

As a whole, by means of coordinating among the test stations to avoid simultaneously executing the test cases potentially incurring the mutual interference, the interference among the TDD radio units can be eliminated thoroughly. Meanwhile, by means of assigning time fragment for each test case, the continuous execution of the test case can be guaranteed.

Optionally, the obtaining unit 320 may traverse a flag pool to retrieve a test case execution flag for each of the other test stations. The test case execution flag may indicate the execution information of the test case being executed by the other test stations. For example, the test case execution flag can be set with numeric value, for example, 0 means no test case is being executed, 1 means the test station is executing a radio TX test case, 2 means the test station is executing a radio RX test case, and the like. The flag fool is utilized to store the test case execution flags associated with the respective test stations. The flag pool can be implemented by hardware, such as the registers, and software, such as the file, database etc. It should be understood that the flag pool can be either positioned in a separate apparatus or in one of the test stations.

As such, the determining unit 330 may determine whether there is the interference between the execution of the test case to be executed by it and the execution of the test cases being executed by the other test stations by comparing the test case execution flag.

Preferably, the test station 300 may further comprise an updating unit (not shown), the updating unit may update the test case execution flag associated with this test station in the flag pool when beginning and finishing the execution of a test case. For example, when the test station 300 begins to execute a radio TX test case, the updating unit sets the corresponding test case execution flag to 1 in the flag pool. And when the test station 300 completes the execution of this radio TX test case, the corresponding test case execution flag will be updated to 0 in the flag pool.

Figure 4:
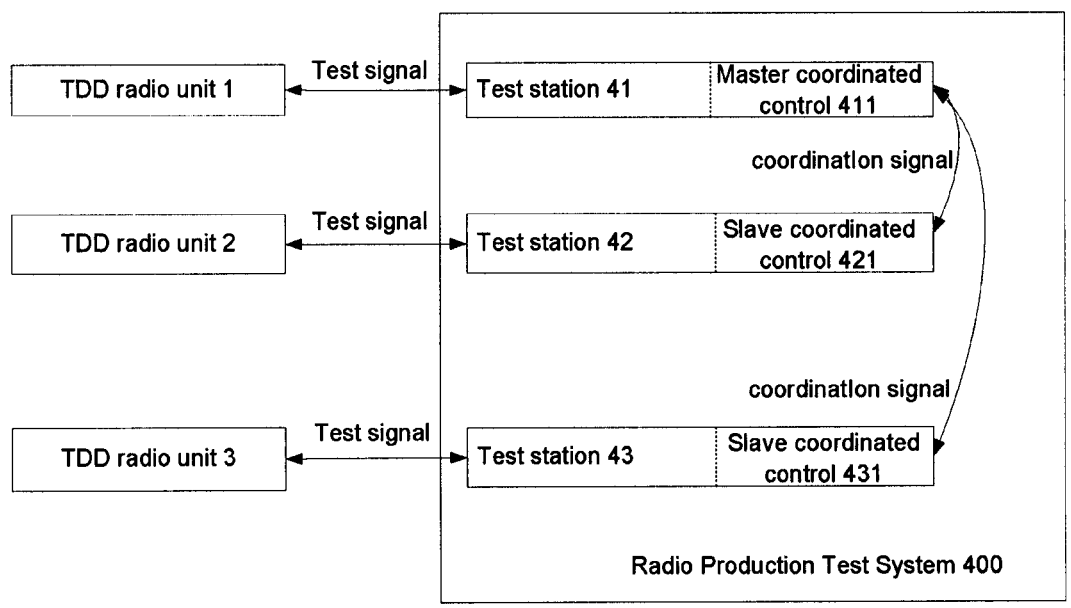
FIG. 4 illustrates a schematic view of an exemplary radio production test system according to an embodiment.

FIG. 4 illustrates a schematic view of an exemplary radio production test system according to an embodiment.

As illustrated, the radio production test system 400 comprises the test stations 41-43. In operation, the test stations 41-43 execute the same functionality as the test station 300 described above. It will be appreciated that, the radio production test system 400 is only exemplary, one or more such test stations may exist in the radio production test system to perform the radio production test for the corresponding radio units.

Preferably, the test stations 41-43 include master coordinated control 411, slave coordinated control 421 and slave coordinated control 431 respectively, where master coordinated control 411 communicated with slave coordinated controls 421 and 431 to maintain the execution information of the corresponding test stations (e.g. test stations 42 and 43) that the slave coordinated control pertains to, such as in a flag pool. It should be understood that the master coordinated control 411 also maintain the execution information of the test station 41 where the master coordinated control is located. In operation, the slave coordinated controls may retrieve the execution information of all the active test stations from the master coordinated control 411, and update the latest execution of the test stations to which the slave coordinated controls pertains to the master coordinated 411. In this way, the embodiment can be implemented without requiring introduce other separate hardware, which may advantageously avoid the unnecessary additional cost.

While the embodiments have been illustrated and described herein, it will be understood by those skilled in the art that various changes and modifications may be made, and equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method of radio production test for one and more time division duplex, TDD, radio units, the one and more TDD radio units are tested by the respective test stations simultaneously, the method comprises:
    assigning a test case in a test suite with a time fragment for executing the test case at an operation frequency by a test station, the execution of the test case will not be interrupted within the time fragment;
    obtaining execution information of the test cases being executed by other test stations;
    determining, based on the execution information, whether electromagnetic wave interference is expected between the execution of the test case at the operation frequency and the execution of the test cases being executed by the other test stations at the operation frequency; and
    executing the test case if it is determined that the electromagnetic wave interference will not present.

2. The method according to claim 1,
    if it is determined that there is electromagnetic wave interference expected between the execution of the test case and that of the test cases being executed by the other test stations, searching for another test case in the test suite whose execution will not cause the electromagnetic wave interference and executing said another test case if found.

3. The method according to claim 1, wherein the test suite at least comprises at least one of radio transmission test case, radio reception test case, non-radio test case.

4. The method according to claim 3, wherein the test suite comprises multiple transmitting test cases and receiving test cases, the method further comprising:
    in response to determining that a proportion of the remaining radio transmission test cases and the remaining radio reception test cases that wait to be executed exceeds a predetermined threshold, prioritizing a dominant type of test cases to be executed.

5. The method according to claim 1, wherein each test case in the test suite is assigned with the time fragment having the equal time length.

6. The method according to claim 1, wherein the time length of the time fragment assigned to the test case is determined based on the execution time of the test case.

7. The method according to claim 1, wherein
    obtaining the execution information comprises traversing a flag pool to retrieve a test case execution flag for each of the other test stations, the test case execution flag indicates the execution information of the test case being executed by the other test stations; and
    the determination as to whether the electromagnetic wave interference is expected between the execution of the test case and that of the test cases being executed by the other test stations is based on the test case execution flag.

8. The method according to claim 7, the method further comprises:

updating the test case execution flag for the test station in the flag pool when beginning and finishing the execution of the test case by the test station.

9. A non-transitory computer-readable storage medium which stores instructions for implementing the steps of the method according to claim 1.

10. A test station for testing a TDD radio unit, the test station comprises:
   an assigning unit adapted to assign a test case at an operation frequency in a test suite with a time fragment for executing the test case by a test station, the execution of the test case will not be interrupted within the time fragment;
   an obtaining unit adapted to obtain execution information of the test cases being executed by other test stations;
   a determining unit adapted to determine, based on the execution information, whether electromagnetic wave interference is expected between the execution of the test case at the operation frequency and that of the test cases being executed by the other test stations at the operation frequency; and
   an executing unit adapted to execute the test case if it is determined that the electromagnetic wave interference will not present.

11. The test station according to claim 10, wherein if there is electromagnetic wave interference expected between the execution of the test case and that of the test cases being executed by the other test stations, the executing unit is further configured to search for another test case in the test suite whose execution will not cause the electromagnetic wave interference and execute said another test case if found.

12. The test station according to claim 10, wherein each test case in the test suite is assigned with the time fragment having the equal time length.

13. The test station according to claim 10, wherein:
   the obtaining unit is adapted to obtain the execution information by traversing a flag pool to retrieve test case execution flags for the other test stations, the test case execution flag indicates the execution information of the test case being executed by the other test stations; and
   the determining unit is adapted to determine whether the electromagnetic wave interference is expected between the execution of the test case and that of the test cases being executed by the other test stations based on the test case execution flag.

14. The test station according to claim 13, the test station further comprises:
   an updating unit adapted to update the test case execution flag for the test station in the flag pool when beginning and finishing the execution of the test case by the test station.

15. A production test system for testing one and more TDD radio units simultaneously, comprising one and more test stations according to claim 10.

16. The test station according to claim 10, wherein the test suite comprises at least one of a radio transmission test case, a radio reception test case, a non-radio test case.

17. The test station according to claim 10, wherein the time length of the time fragment assigned to the test case is determined based on the execution time of the test case.

* * * * *